(12) United States Patent
Martin et al.

(10) Patent No.: US 12,504,282 B2
(45) Date of Patent: Dec. 23, 2025

(54) PHOTOGRAMMETRY SYSTEM

(71) Applicant: INSPHERE LTD., Bristol (GB)

(72) Inventors: Oliver Martin, Bristol (GB); Ben Adeline, Breadstone (GB); Craig Davey, Bath (GB)

(73) Assignee: INSPHERE LTD., Bristol (GB)

( * ) Notice: Subject to any disclaimer, the term of this patent is extended or adjusted under 35 U.S.C. 154(b) by 449 days.

(21) Appl. No.: 18/248,635

(22) PCT Filed: Sep. 27, 2021

(86) PCT No.: PCT/GB2021/052509
§ 371 (c)(1),
(2) Date: Apr. 11, 2023

(87) PCT Pub. No.: WO2022/079410
PCT Pub. Date: Apr. 21, 2022

(65) Prior Publication Data
US 2023/0375343 A1 Nov. 23, 2023

(30) Foreign Application Priority Data

Oct. 12, 2020 (GB) ..................................... 2016182

(51) Int. Cl.
*G01C 11/06* (2006.01)
*G06T 7/292* (2017.01)
(Continued)

(52) U.S. Cl.
CPC .............. *G01C 11/06* (2013.01); *G06T 7/292* (2017.01); *G06T 7/593* (2017.01); *G06T 7/73* (2017.01);
(Continued)

(58) Field of Classification Search
None
See application file for complete search history.

(56) References Cited

U.S. PATENT DOCUMENTS 9,266,238 B2 *  2/2016  Huettenhofer ........... B25J 9/162
2003/0004645 A1  1/2003  Kochi
(Continued)

FOREIGN PATENT DOCUMENTS

CN    110936373 A  *  3/2020  ............ B25J 9/1692
JP    2001508209 A     6/2001
(Continued)

OTHER PUBLICATIONS

Japanese Office Action dated Mar. 5, 2025 in co-pending Japanese Patent Application No. 2023-546570.
(Continued)

*Primary Examiner* — David Ometz
(74) *Attorney, Agent, or Firm* — Perilla Knox & Hildebrandt LLP

(57) ABSTRACT

There is disclosed a photogrammetry system for tracking the position of targets in real-time, using an extensible network of nodes, each of which comprises a stereoscopic camera assembly and a processor configured to process stereoscopic images to generate target data representing the positions of the targets. The target data may then be sent to a hub controller for determining global positions of the targets based on the target data generated at each node.

20 Claims, 5 Drawing Sheets

(51) Int. Cl.
*G06T 7/593* (2017.01)
*G06T 7/73* (2017.01)
(52) U.S. Cl.
CPC .................... *G06T 2200/04* (2013.01); *G06T 2207/10012* (2013.01); *G06T 2207/30164* (2013.01); *G06T 2207/30204* (2013.01)

(56) References Cited

U.S. PATENT DOCUMENTS

| | | |
|---|---|---|
| 2008/0101652 A1 | 5/2008 | Zhao et al. |
| 2015/0168136 A1 | 6/2015 | Kamat et al. |
| 2018/0231653 A1 | 8/2018 | Pradeep et al. |
| 2019/0215486 A1 | 7/2019 | Venshtain |

FOREIGN PATENT DOCUMENTS

| | | | |
|---|---|---|---|
| JP | 2005037191 A | * | 2/2005 |
| JP | 2011185897 A | | 9/2011 |
| JP | 2013079854 A | | 5/2013 |
| JP | 2019066238 A | | 4/2019 |
| JP | 20200135092 A | | 8/2020 |
| WO | 2007044044 A2 | | 4/2007 |

OTHER PUBLICATIONS

International Search Report & Written Opinion for PCT/GB2021/052509; Jan. 10, 2022; 17 pgs.
UK Combined Search & Examination Report for GB2016182.4; Mar. 12, 2021; 6 pgs.

\* cited by examiner

PHOTOGRAMMETRY SYSTEM

FIELD OF THE DISCLOSURE

The present disclosure is concerned generally with the field of photogrammetry, and in particular with a photogrammetry system and method for monitoring the position of targets of interest in three-dimensional (3D) space.

BACKGROUND

Numerous systems exist to monitor the positions of target objects in 3D space, including so-called co-ordinate measuring machines, laser trackers, photogrammetry and motion capture systems.

Some photogrammetry systems comprise a stereoscopic (stereo) camera assembly, in which two cameras are mounted a known distance apart by a rigid structure. The two cameras comprise respective lens assemblies associated with image sensors which are operable to capture a pair of stereoscopic images of a scene. The pair of stereoscopic images are then analysed using conventional photogrammetry techniques to determine 3D positions of targets within the scene, e.g. based on the relative displacement of the targets in the pair of stereoscopic images.

Such photogrammetry systems were originally designed to operate in well-controlled laboratory environments. However, the value of using such systems to perform 3D measurements in harsher environments, such as those encountered in shop-floor manufacturing settings, is recognised and some systems have been adapted with shop-floor applications in mind. For example, it is known to direct a single stereo camera assembly towards a manufacturing shopfloor scene that includes a target of interest, e.g. a robot end-effector, and to determine the relative position of the target from the stereo camera assembly based on an analysis of the stereoscopic images captured by the stereo camera assembly.

Despite prior efforts in the field, the above systems suffer a number of disadvantages that make it difficult to obtain position data that is accurate enough to be used in harsher or complex settings.

Firstly, the accuracy of a single stereo camera assembly is limited by its "base length", which is the separation distance between the lens assemblies. For a given base length, measurement errors tend to increase in a squared relationship with range, i.e. the distance of the target being monitored from the cameras; doubling the measurement range introduces approximately four times the error. It may be possible to increase the accuracy of the cameras at long ranges (such as those typically encountered in a manufacturing setting) by increasing the base length. However, doing so is often impractical and itself introduces errors into the measurement because the rigid structure between the cameras will be susceptible to larger thermal and vibrational influences (e.g. when used in a manufacturing setting).

It is also known that, in complex environments, the line-of-sight of the cameras towards the target may be obstructed at times, thereby making it difficult to capture images of the target. For example, a target in the form of a robot end-effector may face (and thus be visible to) the cameras at the start of a manufacturing operation, but then turn to face away from the cameras during the operation, thereby interrupting relevant data capture. Manufacturing processes etc. often require continuous and real-time monitoring of target positions within the scene, such that conventional systems are unsuitable for such applications.

It is desired to provide a photogrammetry system that enables accurate and continued position monitoring of target objects so that it may be particularly suitable for use in complex settings.

SUMMARY OF THE DISCLOSURE

According to an aspect, there is provided a photogrammetry system for determining a position of a target, comprising: a network of two or more nodes arranged about a scene which includes the target; and a hub controller in communication with the network of two or more nodes. Each node comprises: at least two digital cameras configured to capture a set of stereoscopic images of the scene in synchronicity with the other node or nodes in the network; and a processor configured to process the set of stereoscopic images to determine a three-dimensional position of the target and to cause the node to transmit target data including the three-dimensional position of the target to the hub controller, if the target is visible in the set of stereoscopic images. The hub controller is configured to: receive the target data from the network of two or more nodes; and determine a global position of the target in a first co-ordinate space, based on the three-dimensional position or positions included in the target data received from the network of two or more nodes.

By determining a global position of the target based on the three-dimensional positions reported by (received from) plural nodes, the accuracy of the global positioning determination may be increased as compared to that achieved by conventional systems in which a single node or stereo camera assembly is used.

Furthermore, by determining three-dimensional positions of the target locally at each node and transmitting the three-dimensional positions (e.g. in the form of co-ordinate values) to the hub controller for further processing, the system is able to avoid data transfer bottlenecks that would otherwise occur if, for example, the image data itself is transferred from each node to the hub controller for central image processing. This may be advantageous in that it increases the processing efficiency of the system and therefore reduces the overall processing time, thereby allowing real-time position monitoring.

The two or more nodes may be located at different positions about the scene to capture images of the scene from unique viewpoints. This may reduce or even avoid the risk that line of sight to the target will be completely lost.

The system may be extensible in that the number of nodes in the network may be adjustable to include any number of nodes. In that regard, the number of nodes may be adjusted without substantially affecting operation of the nodes or the hub controller. For example, the hub controller may be configured to determine a global position of the target based on all of the three-dimensional positions received for that target (for a given time stamp) from the network of nodes, regardless of the number of nodes.

The network may include at least four nodes. This may achieve a minimum desired level of accuracy and versatility for monitoring a target within a complex setting.

The three-dimensional position included in the target data may be a relative position of the target from the node. The three-dimensional position may be represented in the form of three-dimensional co-ordinate values.

The hub controller may be configured to convert the relative position of the target to an absolute position in the first co-ordinate space, by determining a positional relationship between the target and a reference point. A position of the reference point within the first co-ordinate space may be known to the hub controller. The reference point may be a reference point on the node in question or a reference point corresponding to a reference target located within the scene.

A reference target may be located at the reference point within the scene. The processor may be configured to process the set of stereoscopic images to determine a three-dimensional position of the reference target relative to the node and to cause the node to transmit target data including the three-dimensional position of the reference target to the hub controller. The hub controller may be configured to determine the positional relationship between the target and the reference point by comparing their relative positions from the node.

The hub controller may be configured to receive reference data indicating the position of the reference point within the first co-ordinate space.

Each node may be configured to process the set of stereoscopic images to identify the target, if visible, and generate metadata indicating the determined identity of the target.

The target data transmitted to the hub controller may further comprise the metadata. Metadata indicating the determined identity of the target may be advantageous to allow the hub controller to group three-dimensional positions corresponding to the same target. This in turn may allow the positions of multiple targets within the scene to be monitored.

The hub controller may be configured to issue a trigger command to the network of two or more nodes to control synchronous capture of respective sets of stereoscopic images.

The hub controller may be configured to determine the global position of the target by: performing a best-fit operation on plural three-dimensional positions determined for the target.

The system may further comprise a flash unit for illuminating the scene with infrared radiation. The digital cameras may be sensitive to the infrared radiation such that the stereoscopic images represent the intensity of infrared radiation reflected by the scene.

The target may comprise a marker attached to an object within the scene.

The target may comprise a platform and a marker arranged at a first predefined position on the platform. The processor may be further configured to process the set of stereoscopic images to determine the position of the marker on the platform and identify the target based on the determined position.

The platform may have a plurality of attachment points arranged in a predefined array of positions on the platform. The marker may be suitable for being removably attached to the platform at any one of the attachment points at a time.

The target may comprise a plurality of markers arranged in a predefined pattern. The processor or the hub controller may be configured to determine an orientation of the target based on the three-dimensional positions of the plurality of markers.

Each marker may comprise a retroreflective material and/or may have a spherical shape.

According to another aspect of the present disclosure, there is provided a method of operating the photogrammetry system of any one of the preceding statements. The method comprises each of the nodes: capturing a set of stereoscopic images of the scene using the digital cameras in synchronicity with the other node or nodes in the network; processing the set of stereoscopic images to determine a three-dimensional position of the target and to transmit target data including the three-dimensional position of the target to the hub controller, if the target is visible within the stereoscopic images. The method further comprises the hub controller: receiving the target data from the network of two or more nodes; and determining a global position of the target in the first co-ordinate space based on the three-dimensional position or positions included in the target data received from the network of two or more nodes.

Where the three-dimensional position included in the target data is a relative position of the target from the node, the method may comprise the hub controller converting the relative position of the target to an absolute position in the first co-ordinate space, by determining a positional relationship between the target and a reference point, wherein a position of the reference point within the first co-ordinate space is known to the hub controller.

A reference target may be located at the reference point within the scene. In such embodiments, the method may comprise the processor processing the set of stereoscopic images to determine a three-dimensional position of the reference target relative to the node and causing the node to transmit target data including the three-dimensional position of the reference target to the hub controller. The method may comprise the hub controller determining the positional relationship between the target and the reference point by comparing their relative positions from the node.

The method may comprise receiving, at the hub controller, reference data indicating the position of the reference point within the first co-ordinate space.

The method may comprise each node processing the set of stereoscopic images to identify the target within the scene and generating metadata indicating the determined identity of the target, wherein the target data further comprises the metadata.

The method may comprise the hub controller issuing a trigger command to instruct the nodes in the network to perform synchronous image capture. The method may comprise each node, in response to receiving the trigger command from the hub controller, capturing the set of stereoscopic images in synchronicity with the other nodes.

Determining the global position of the target may comprise performing a best-fit operation on plural three-dimensional positions determined for the target.

The best-fit operation may be a weighted fit of the three-dimensional positions, wherein the weighting attributed to each three-dimensional position may be based on the relative position of the target from the node to which the three-dimensional position corresponds.

The method may comprise the two or more nodes processing the sets of stereoscopic images in parallel.

According to an aspect of the technology described herein, there is provided a target for use with a photogrammetry system, such as the system described above in the preceding statements. The target may have any one or more of the features described herein. Accordingly, the target may comprise a platform and a marker arranged at a first predefined position on the platform. The platform may have a plurality of attachment points arranged in a predefined array of positions on the platform. The marker may be suitable for being removably attached to the platform at any one of the attachment points.

The processor(s) and controller(s) (and various associated elements) described herein may comprise any suitable circuitry to cause performance of the methods described herein and as illustrated in the Figures. The processor or controller may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU), to perform the methods.

The processor or controller may include at least one microprocessor and may comprise a single core processor, may comprise multiple processor cores (such as a dual core processor or a quad core processor), or may comprise a plurality of processors (at least one of which may comprise multiple processor cores).

The processor or controller may be part of a system that includes an electronic display, which may be any suitable device for conveying information, e.g. position data, to a user.

The processor or controller may comprise and/or be in communication with one or more memories that store the data described herein, and/or that store software for performing the processes described herein.

The memory may be any suitable non-transitory computer readable storage medium, data storage device or devices, and may comprise a hard disk and/or solid state memory (such as flash memory). The memory may be permanent non-removable memory, or may be removable memory (such as a universal serial bus (USB) flash drive).

The memory may store a computer program comprising computer readable instructions that, when read by a processor or controller, causes performance of the methods described herein, and as illustrated in the Figures. The computer program may be software or firmware, or may be a combination of software and firmware.

The computer readable storage medium may be, for example, a USB flash drive, a compact disc (CD), a digital versatile disc (DVD) or a Blu-ray disc. In some examples, the computer readable instructions may be transferred to the memory via a wireless signal or via a wired signal.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

It will be appreciated that like reference numerals are used in the drawings to label like features of the technology described herein.

DETAILED DESCRIPTION

Figure 1:
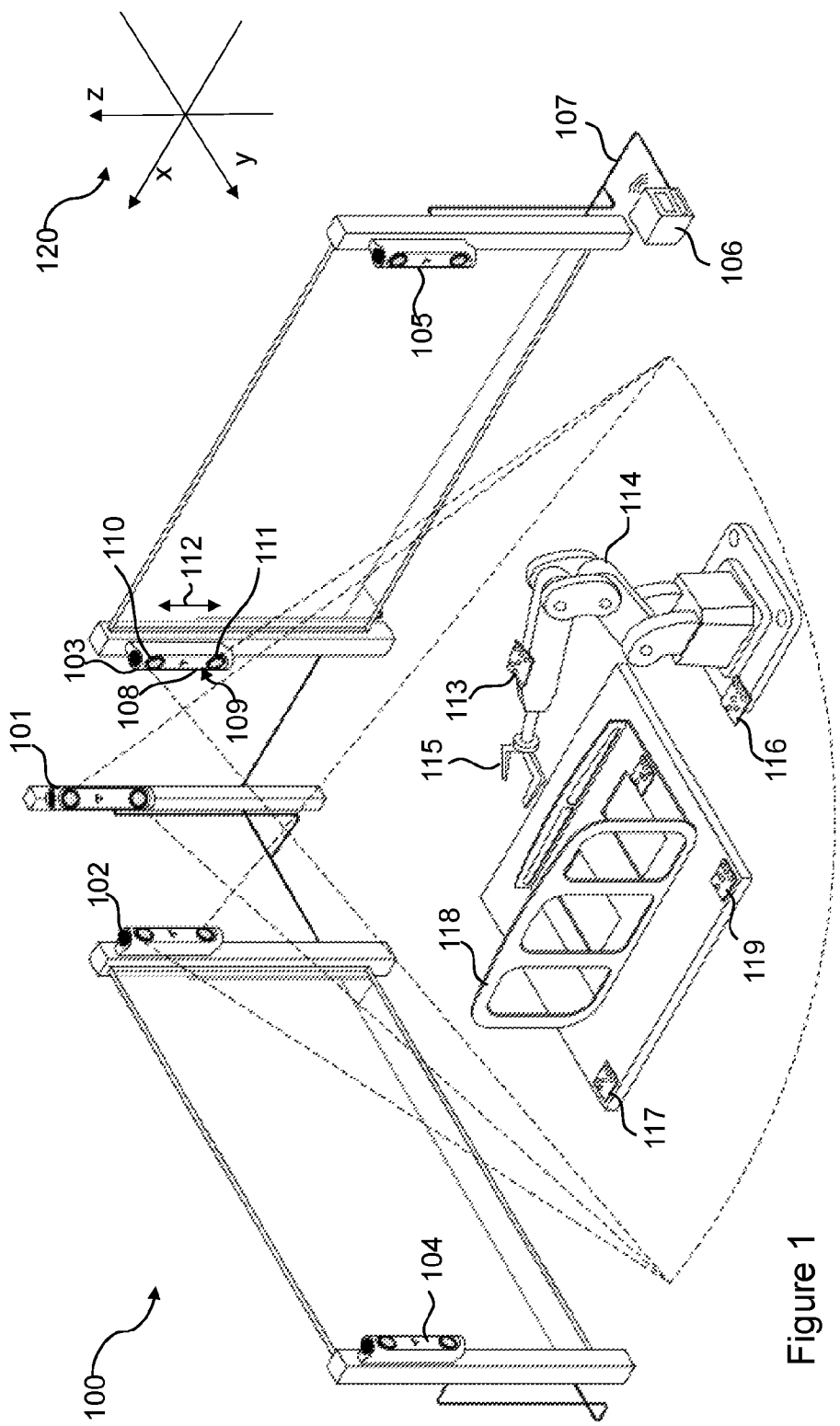
FIG. 1 is a schematic diagram illustrating a photogrammetry system in accordance with an example embodiment of the technology described herein.
Figure 2:
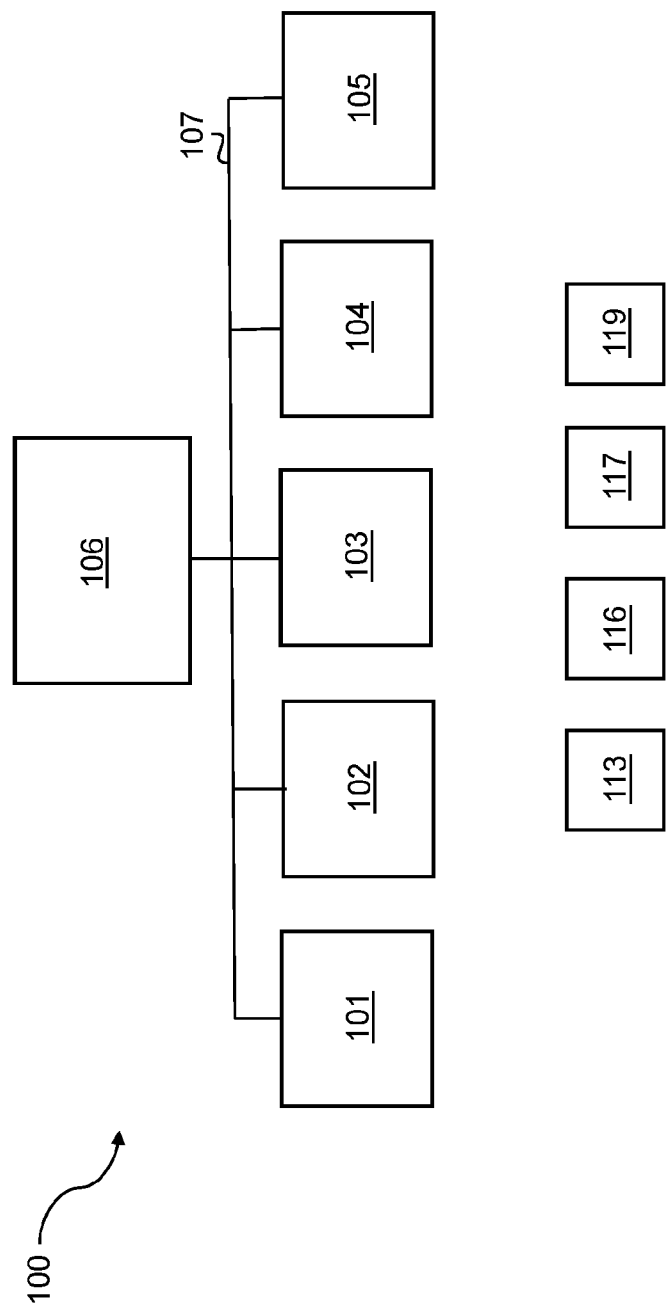
FIG. 2 is a block diagram showing, amongst other things, the functional units of the system of FIG. 1.

FIGS. 1 and 2 show an example of a photogrammetry system 100 which is suitable for determining and monitoring, in real-time, the position of target objects (referred to hereafter as "targets") in accordance with the technology described herein. In the example of FIGS. 1 and 2, the system is employed to monitor targets in a scene corresponding to a manufacturing setting, although it will be appreciated that the system 100 is applicable more generally to any type of setting. For example, the system could be employed in a medical operating theatre to monitor the position of a surgical tool.

The system 100 comprises an interconnected network of node devices 101, 102, 103, 104, 105 that are in wired communication with a hub controller 106 via one or more communications lines 107 (although wireless communication is equally possible). The hub controller 106 is operable using processing circuitry to send control signalling to the nodes 101, 102, 103, 104, 105, to control operation of the nodes in accordance with the methods described herein.

Figure 3:
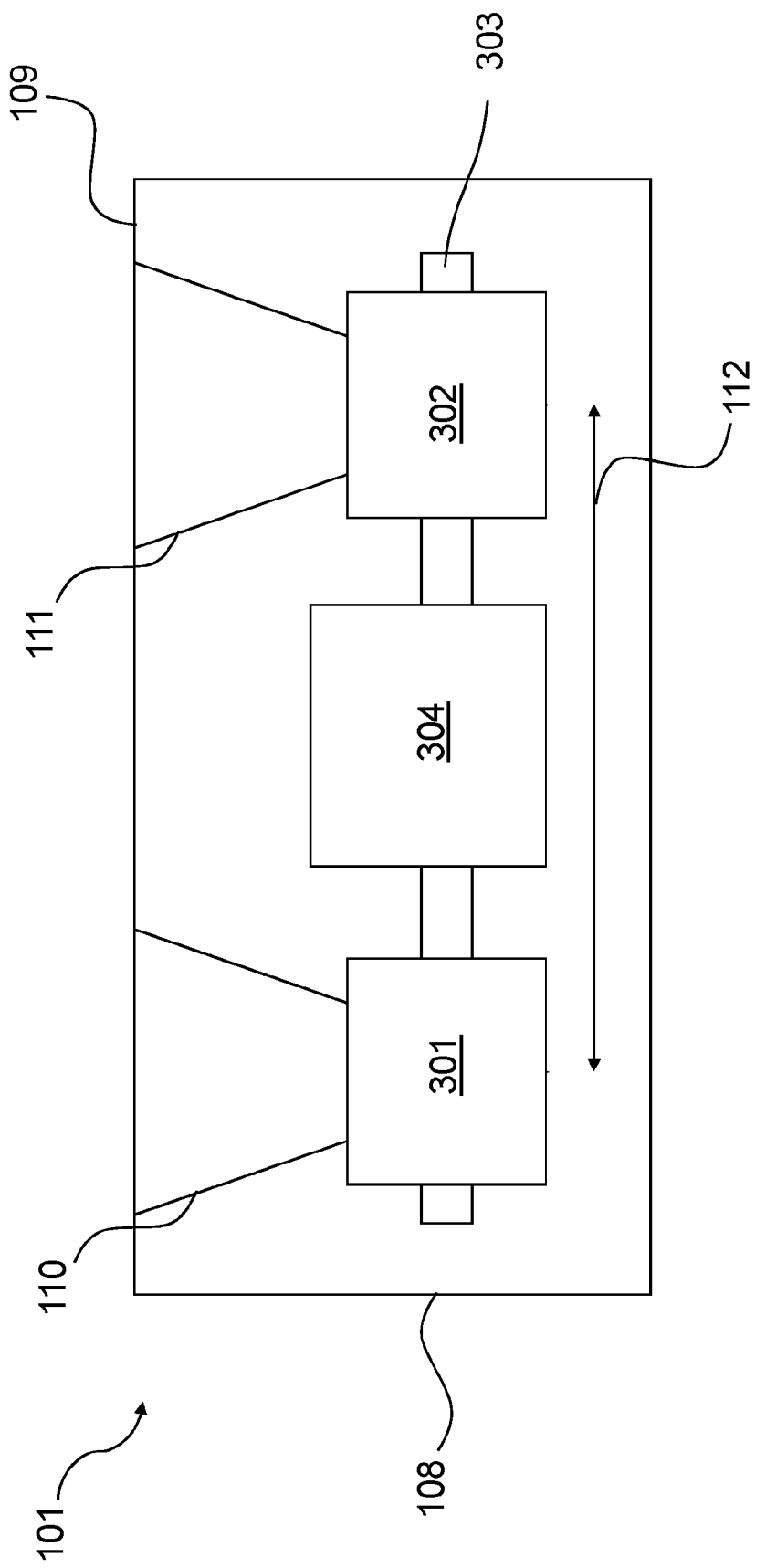
FIG. 3 is a schematic diagram illustrating an example node of the system of FIGS. 1 and 2.

As best shown in FIG. 3, which schematically illustrates one such node 101 of the system 100, each node comprises a housing 108 which encloses a first digital camera 301 and a second digital camera 302, which are mounted apart on a rigid support structure 303. The cameras 301, 302 and the associated support structure 303 form a stereo camera assembly.

Each camera 301, 302 has an image sensor (not shown), e.g. a charge-coupled device (CCD), and an associated lens assembly 110, 111. The lens assemblies 110, 111 are exposed on a common, exterior surface 109 of the housing 108 so as to direct external light (electromagnetic radiation) incident on the lens assemblies 110, 111 towards their associated image sensors. The node 101 may also comprise at least one flash unit (not shown), e.g. one flash unit per camera 301, 302, which is operable to illuminate the scene to be imaged.

The first and second cameras 301, 302, and thus their corresponding lens assemblies 110, 111, are spaced apart by a known distance referred to herein as the base length 112 of the stereo camera assembly. In the system of FIGS. 1 and 2, the camera assembly in each node 101, 102, 103, 104, 105 has the same base length 112, e.g. of 400 mm, although in other arrangements the base length 112 of the camera assembly may differ from node-to-node.

The node 101 further comprises an on-board processor 304, which is operable (e.g. under the direction of the hub controller 106) to cause the cameras 301, 302 to simultaneously capture images representing the light incident on the sensors. Each stereo camera assembly will generate a set (in this example a pair) of stereo images representing the scene falling within the fields of view of the lens assemblies 110, 111. In that regard, the lens assemblies 110, 111 are oriented such that their fields of view at least partly overlap. In this way, any target located within the overlapping portion will be represented in both stereo images, albeit at offset positions in each image due to the base length spacing between the lens assemblies 110, 111.

The on-board processor 304 is configured to perform edge processing at the node, including processing of the stereo images generated by the cameras 301, 302 in the node 101. As will be described in further detail below, the processor 304 is configured to process the pair of stereo images to determine 3D positions of targets within the scene. To facilitate this, the processor 304 may receive, or otherwise be provided with, all information necessary to determine the positions of the targets based on the image data, such as the Epipolar geometry of the stereo camera assembly in the node. Epipolar geometry refers to the relative separation and orientation of the cameras 301, 302 in the stereo camera assembly and is precisely determined by a conventional calibration process not described herein.

After determining the 3D positions of targets within the scene, the processor 304 will cause the node to report (i.e. send) the determined 3D positions of the targets to the hub controller 106. The hub controller 106 will then determine, for each target, a single global position of the target within the first co-ordinate space 120, based on the 3D positions reported by the nodes for that target.

With reference to FIG. 1, the nodes 101, 102, 103, 104, 105 are located at different positions about the scene to capture images of the scene from unique viewpoints. Further, the nodes are arranged and oriented such that the fields of view of at least some of the nodes overlap at points within the scene at which one or more targets are expected to be visible to the nodes at some point in time.

It will be appreciated that a target can be any object (or indeed part of an object) of interest that is identifiable in the images using conventional image processing techniques. The target may, for example, be a tool, such as a robot end-effector, which is movable within the scene relative to the nodes. Alternatively, the target may be in the form of a marker or a group of markers that is fixedly attached to a, e.g. moveable, tool such that the position of the tool can be determined based on the position of the marker(s).

In the example of FIGS. 1 and 2, the scene comprises a first target 113 which is attached to a moveable robotic arm 114 at a fixed position relative to an end-effector 115 of the arm 114. A second target 116 is attached to a first ground reference point having fixed proximity to the robotic arm 114, a third target 117 is attached to a second ground reference point in fixed proximity to a work piece 118 or other component to be manipulated or otherwise used in a manufacturing process and a fourth target 119 is attached to a third reference point in fixed proximity to the work piece 118.

The positions of the ground reference points and thus the second, third and fourth targets 116, 117, 119 in a first co-ordinate space 120 are known to the nodes 101, 102, 103, 104, 105 and the hub controller 106, such that the position of the movable first target 113 in the first co-ordinate space 120 can be monitored relative to the positions of the second, third and/or fourth targets 116, 117, 119, based on an analysis of the stereoscopic images of the targets. The positions of the ground reference points are pre-determined by a conventional pre-surveying technique not described herein.

It will be appreciated that by using a system having a network of plural nodes, as compared to a single node or stereo camera assembly, the risk that line of sight to the targets will be lost completely at any point, e.g. during a manufacturing operation, is reduced. Indeed, the end user is able to strategically place the nodes about the scene, to ensure that line of sight to the target(s) is maintained for at least one, and preferably two or more or all of the nodes in the network. This may avoid interruptions in the determination of target positions, thereby enabling continuous monitoring of the targets.

Although five nodes are shown in FIGS. 1 and 2, this is for illustration purposes only. The system may comprise a network comprising any number of two or more nodes, and indeed an advantage of the system is that the number of nodes in the network is readily adjustable to suit a particular scene without requiring modifications to the position determination process. Indeed, an entire production line or even an entire factory can be monitored as a single network.

Additionally, the nodes, in particular their cameras 301, 302, may be configured to detect light in the visible or infrared range of the electromagnetic spectrum. Correspondingly, the flash unit(s) of each node may be configured to illuminate the scene with radiation in a corresponding range of the electromagnetic spectrum.

Using digital cameras and flash units that operate in the infrared range of the spectrum may be particularly advantageous over those operating in the visible range. In that regard, it will be appreciated that ambient visible light is typically a weak and variable light source that restricts the visibility of targets over long ranges. Further, flash units that transmit visible radiation to illuminate targets are often unpleasant or unsafe for people who work within the field of view of the flash units. This is particularly the case if high frequency strobing is used. Infrared radiation, on the other hand, transmits relatively strongly (with greater amplitude) over large distances and does not pose a visible light hazard to people working within range of the flash units. Accordingly, by utilising infrared radiation, it is possible to improve the resolvability of targets within the stereo images whilst avoiding visible light hazards.

Further, while the system has been described above with respect to stereo camera assemblies having only two digital cameras capturing a corresponding pair of stereo images, each stereo camera assembly may have three or more cameras spaced apart by known distances (e.g. to widen the field of view of a respective node). Such a camera assembly would generate a corresponding set of three or more stereoscopic images.

Further still, the system is not dependent on maintaining rigidly mounted nodes—their movement can be computed and compensated without affecting system accuracy. The system can therefore be used in settings where nodes are movable—for example mounted on a moving vehicle or on a drone.

Figure 4:
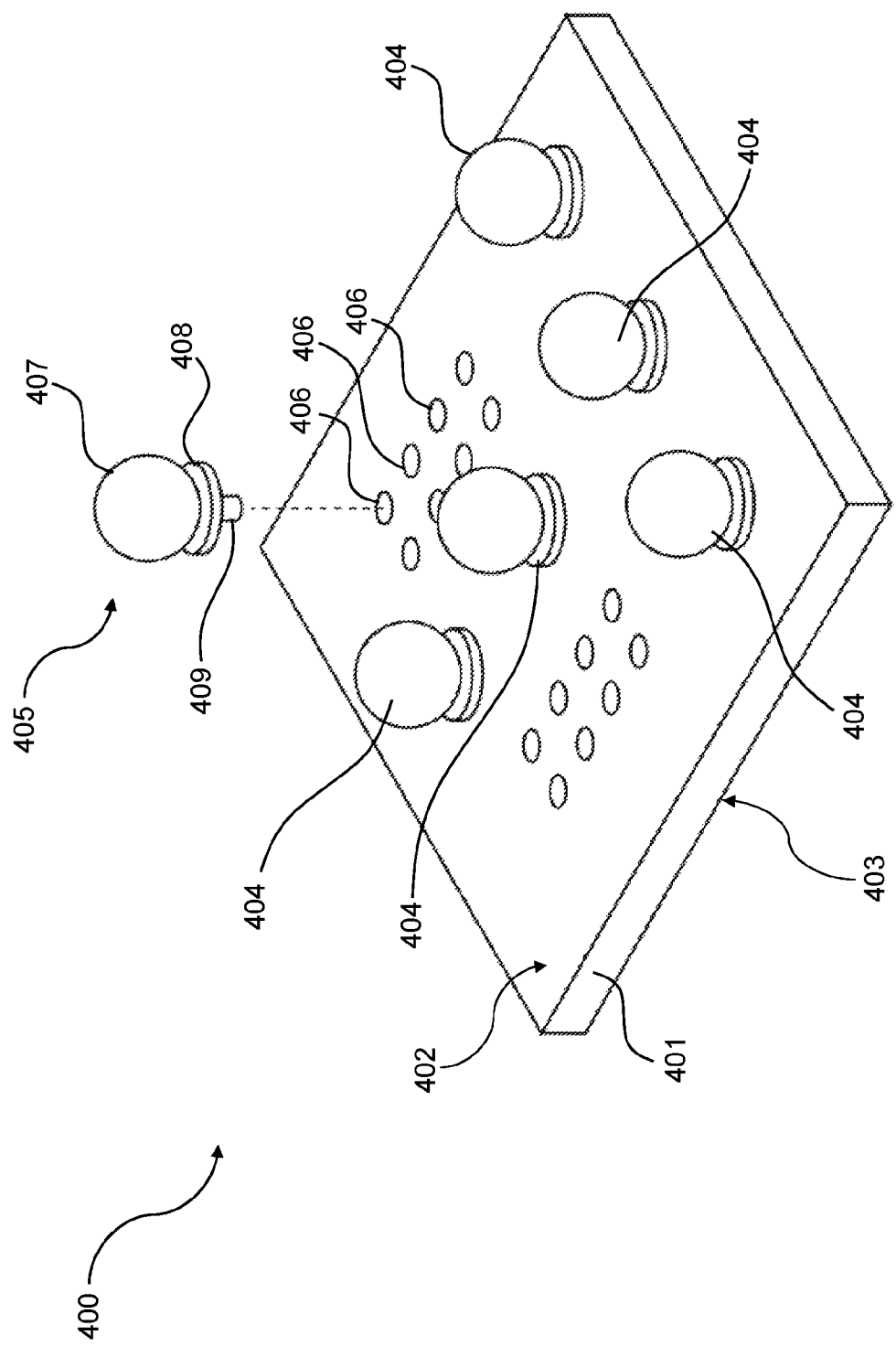
FIG. 4 is a schematic diagram illustrating an example embodiment of a target of the system of FIGS. 1 and 2, the position of which is to be monitored.

FIG. 4 schematically illustrates one example of the targets 113, 116, 117, 119 that are attached to objects within the scene to be imaged by the system of FIGS. 1 and 2.

The target 400 comprises a plate (or generally, a platform) 401 having a top surface 402 and a bottom surface 403 opposite the top surface 402. The bottom surface 403 is suitable for attachment to an object within the scene, e.g. by adhesion or other attachment means. On the top surface 402 of the plate 401, there is affixed a first group of markers 404 which are arranged to define a distinctive pattern, which is recognisable, when imaged, by the processors 304. In this example, the first group of markers 404 define a T-shaped pattern, although other patterns are also possible.

The target 400 further comprises a moveable marker 405 which is suitable for being removably attached to the plate 401 at any one of a plurality of attachment points 406 located on the top surface 402. In the illustrated example, the moveable marker 405 comprises a main body portion 407, a base 408 and a pillar 409 protruding from a side of the base 408 which is opposite the main body portion 407. Each attachment point 406 is correspondingly in the form of a hole or indentation which is configured to receive the pillar 409 of the moveable marker 405. The cross-sectional profile of the pillar 409 and the hole 406 are mutually shaped such that the pillar 409 may be received snugly and securely within the hole 406, while still being capable of being removed by force.

The attachment points (holes) 406 are arranged in an array of predefined positions on the top surface 402 of the plate 401 such that the position of the moveable marker 405 with respect to the first group of markers 404 may be selected and varied by the user on a target-by-target basis. Accordingly, each target 400 in a scene, such as that described above with respect to FIGS. 1 and 2, may be configured with a unique pattern of markers 404, 405, and therefore allow the processors 304 to identify the target 400 by its unique pattern. In this way, the target 400 can encode data in a visual, machine-readable form by varying the position of the marker 405.

The main body portion 407 of each marker 404, 405 has a substantially spherical shape. Such a shape will have a more consistent appearance in images and therefore facilitate quicker and easier detection of the markers over long distances and a wide range of acceptance angles. This is particularly true as compared to circular disk-shaped markers which can appear as ellipses (rather than circles) in the field of view of the node if their camera-facing surfaces are oriented within the scene at an angle relative to the image plane of the cameras. In such cases, automatic recognition of the marker becomes problematic as the ellipse becomes elongated from a more glancing angle. Also the amount of light reflected by a planar disc is severely attenuated when seen at a glancing angle, while spheres avoid this problem.

The individual markers 404, 405 may comprise steel and may also or instead be coated with a retroreflective material that is configured to reflect electromagnetic radiation at wavelengths to which the image sensors of the nodes described above are sensitive. Retroreflective materials may be in the form of a paint that comprises glass beads within a substrate.

Although the markers have been described above as being spherical in shape, it is possible for other forms of coded and uncoded markers to be used in the system of FIGS. 1 and 2, and these can be retroreflective, white (or other colours), passive markers and/or active markers, i.e. markers that are self-illuminated. One example of an active marker is an LED light source.

Operation of the system will now be described with respect to FIGS. 5 and 6.

Figure 5:
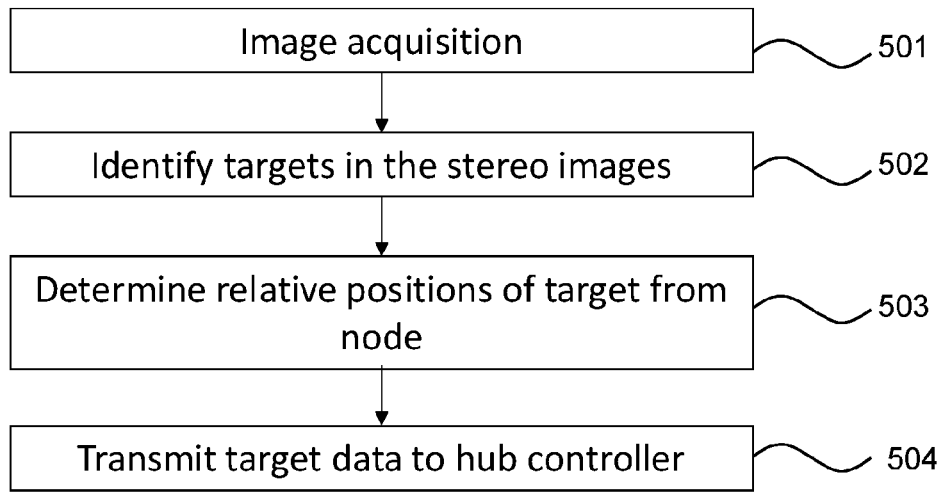
FIG. 5 is a flow chart schematically illustrating the processing steps carried out by a node of the system of FIGS. 1 and 2.

FIG. 5 is a flow chart schematically illustrating the processing method carried out by each node 101, 102, 103, 104, 105 in the system of FIGS. 1 and 2.

The method begins at block 501, at which the node is triggered to capture a pair of stereo images of the scene. The network of nodes may receive a trigger command from the hub controller 106 (or other host device), to cause the cameras 301, 302 of each node to capture first and second stereo images of the scene simultaneously and in synchronicity with the other nodes of the network.

There may be an initialisation step prior to block 501, wherein the node receives reference data storing information necessary to perform the image processing operation and the corresponding position determination. For example, the node will receive data concerning the targets within the scene (such as the predefined patterns of the markers forming the targets), the positions of the reference points within the first co-ordinate space 120 and/or the Epipolar geometry of the stereo camera assembly.

At block 502, the processor 304 operates to process the set of stereo images to detect and identify the targets that are visible within the images. The processor 304 may use conventional image processing techniques for object recognition to determine which one or more of the targets 113, 116, 117, 119 are visible in both the first and second stereo images of the pair. With regard to the specific example of FIGS. 1 to 4, in which each target has a unique pattern of markers, the processors 304 can (and if visible will) identify the targets by their unique pattern of markers. If the first target 113, i.e. the moving target of interest, and at least one of the second, third and fourth targets 116, 117, 119 located at known reference points within the scene are visible in the first and second stereo images, the processor 304 will proceed to block 503.

At block 503, the positions of the targets identified in the first and second stereo images are analysed by the on-board processor 304 to determine their 3D positions relative to a reference point on the node in question. It will be appreciated that any conventional photogrammetry technique that is suitable for determining 3D positions of objects in stereo images may be used for this purpose. For example, corresponding targets in the first and second stereo images may be subjected to point triangulation, whereby the processor uses the offset positions of each target (or individual markers) in the first and second stereo images, together with knowledge of the Epipolar geometry of the stereo camera assembly, to determine the 3D positions of the targets relative to the node.

At this stage, the orientation of the targets may be determined based on the relative positions of their individual markers. That is, the node is able to determine not only the position of the targets, but also their pose. In this way, the system is able to resolve the positions of the targets in six degrees of freedom.

The processor 304 generates target data that comprises information indicating the determined 3D position of the targets 113, 116, 117, 119. This may include the 3D position of the target as determined based on the 3D positions of the plurality of markers forming the target, or the 3D positions of the markers themselves. The target data may also include the determined orientation of a target. The 3D position(s) is in the form of co-ordinate values, and as such are readily transmittable throughout the system. The target data may also comprise metadata that includes one or more of unique point (or target) identifiers (i.e. names), data quality indicators such as the roundness of measured targets, and the camera settings used for the dataset, all of which can be used to enhance the computation of the global position data, as is described later in reference to FIG. 6. The metadata may also comprise time-stamp data associated with the 3D position data, wherein the time-stamp data indicates the time at which the set of stereoscopic images was captured and thus the time at which the target was at the determined position.

At block 504, the target data comprising the position data and metadata for each target identified within the stereoscopic images is sent via the communications line 107 to the hub controller 106. The target data may be sent to the hub controller at substantially the same time as the other nodes in the network. If, however, a node was unable to identify targets within the pair of stereoscopic images, the node may be configured so as not to send target data to the hub controller, to save network bandwidth, or otherwise indicate its failure to identify targets to the hub controller.

In embodiments, the nodes are configured to process their respective pairs of stereo images in parallel, such that the overall processing time is reduced. The nodes may operate in parallel by performing any one or more of the functions at blocks 502 and 503 at the same time as one (or more or all) of the other nodes in the network performs any one or more of the functions at blocks 502 and 503.

Although target identification has been described above as being performed as part of block 502 before determining the relative position of the targets from the node at block 503, it will be appreciated that the step of identifying a target can be performed after block 503. For example, at block 502 the on-board processor 304 may simply detect the presence of markers in the images and proceed to determine the relative positions of the markers from the node at block 503, before the markers are then classified and identified as belonging to a specific target before block 504.

Furthermore, although the node has been described above as being configured to report to the hub controller the relative positions of the targets from the nodes, this is not necessarily always the case. For example, in some arrangements, each node may be configured to convert the relative positions (co-ordinate values) of the targets from the node to absolute positions (co-ordinate values) within the first co-ordinate space 120 and report the absolute positions to the hub controller in addition to or instead of the relative positions. Thus the target data may comprise information indicating the 3D position of the first target 113 and optionally the second, third and fourth targets 116, 117, 119 in the first co-ordinate space 120.

As mentioned above, the position of the second, third and fourth targets 116, 117, 119 in the first co-ordinate space 120 may already be known to the node. In such cases, the absolute position of the first target 113 may be determined based on a positional relationship between the first target 113 and the first, second and/or third targets 116, 117, 119. The positional relationship may be determined at the processor by comparing the relative position of the first target 113 (from the node) to that of the second, third and fourth target(s) 116, 117, 119.

In other embodiments, the node position in the first co-ordinate space 120 may be predetermined and known to the node so that the absolute position of the first target 113 can be determined based on its relative position from the known position of the node.

Figure 6:
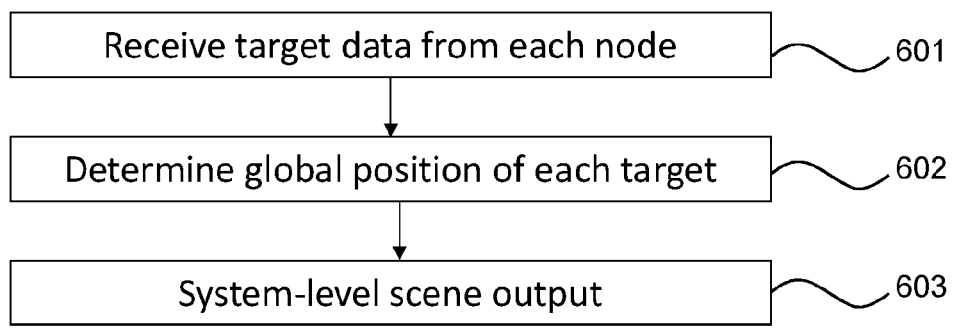
FIG. 6 is a flow chart schematically illustrating the processing steps carried out by a hub controller of the system of FIGS. 1 and 2.

FIG. 6 is a flow chart schematically illustrating the processing steps carried out by the hub controller 106.

At block 601, the hub controller 106 receives the target data from the nodes that have identified targets within their pairs of stereo images. It will be appreciated that not all of the nodes will necessarily always transmit target data to the hub controller (e.g. due to obscured line of sight to targets). However, missing or incomplete target data from individual nodes does not prevent the hub controller 106 from resolving the 3D positions represented in the target data received from nodes that have identified targets within their pairs of stereo images.

The datastream is substantially continuous (in that it is sent at high, uninterrupted intervals) as long as one node can always see a target. If a target drops out of sight of all nodes, its position will not be determined and sent to the hub controller, but even in that case the target position will be re-determined and sent to the hub controller when it comes back into the line of sight of any one of the nodes.

At block 602, the global position of each target represented in the received target data is determined based on the 3D positions of the target (where the 3D positions for a target may be for the target as a whole or individual markers forming the target) as determined locally at the nodes. The reported positions for a target may differ as a result of inherent inaccuracies of the nodes. Therefore, the target data from the nodes may collectively define a set of 3D points for the target, i.e. a set of plural 3D positions for the first target 113. The hub controller 106 is therefore configured to determine a single global position that is representative of the set of 3D points, and in particular a global position that best represents the determined 3D position(s) reported by the nodes. In embodiments, the hub controller performs a best-fit operation on the set of 3D points for each target, to determine the positions of the targets.

Where the target data received at the hub controller from each node comprises the relative 3D positions of the target(s) from the nodes, the hub controller 106 will perform an initial step of converting the relative positions from the nodes to absolute positions within the first co-ordinate space 120. This can be done substantially as described above, based on a positional relationship determined between the first target 113 and the second, third and/or fourth targets 116, 117, 119 located at fixed reference points. The hub controller will proceed to determine a best-fit of the converted 3D positions of at least the first target 113 in the first co-ordinate space 120.

Where the target data received at the hub controller from the network of nodes comprises absolute 3D positions of the first target in the first co-ordinate space, the hub controller 106 will determine a best-fit of the target positions reported by the nodes.

In both cases, the best-fit operation may determine a weighted fit of the set of 3D positions for the target. The weighting used for each 3D position may be selected based on a number of factors, such as the data quality indicators described above. In some arrangements, the weighting used for each 3D position is selected based on the distance between the target and the node which reported the position. The weighting may be inversely proportional to the distance. That is, more weight is given to 3D positions corresponding to nodes that are closer to the target in question. For example, 3D positions that have been derived locally at nodes that are closer to the target are given more weight than 3D positions that have been derived locally at nodes that are further from the same target.

The orientation of the target(s) may also be determined by the hub controller 106 based on the target data, e.g. the reported 3D positions of the individual markers, such that the system is able to resolve the positions of the targets in six degrees of freedom. The orientation of a target may be determined based on the relative absolute positions of its markers (which may be arranged in a predefined pattern which is known to the hub controller).

It will be appreciated that by determining a global position of the target based on the 3D positions reported by plural nodes, the accuracy of the global positioning determination is increased as compared to that achieved by conventional systems in which a single node or stereo camera assembly is used.

At block 603, the global positions and/or orientations of the targets in the first co-ordinate space are output. The global positions and/or orientations may be output and used in a variety of ways, depending on the specific application of the system. In the example of FIGS. 1 and 2, the system operates as a robot teaching or control system, wherein the measured global position of at least the first target 113 is used to adjust or guide the robotic arm 114 and thus the position of the end-effector 115. The position of the end-effector 115 may be calculated based on a known positional relationship between it and the target 113.

The processing steps described above with respect to FIGS. 5 and 6 may be repeated, e.g. continuously at a set frequency, such that the system can track the global position and/or orientation of the target over time. For example, each node is able to capture and process a pair of stereoscopic images, and the hub controller is able to process the 3D positions reported by the nodes to determine global target positions and/or orientations, at frequencies greater than 3 Hz, e.g. up to 50 Hz, for example. This is particularly suitable for manufacturing environments where real-time continuous monitoring of moving objects is necessary. Further, by monitoring the global position and/or orientation of the target over time, the system is able to track the velocity and acceleration etc. of the target, e.g. based on time-stamp data associated with the 3D position data, Although the technology has been described above with respect to tracking the position of targets by attaching markers to objects within the scene, marker-based tracking is optional. As mentioned above, the targets being tracked may be any objects within the scene that are recognisable in the stereoscopic images.

It will be appreciated that by determining the positions of the targets locally at the nodes and determining centrally at the hub controller a global position and/or orientation of the target based on the determined positions reported by any one or more of the nodes, the system is extensible in that the number of nodes in the network may be adjusted without adversely affecting the functionality and processing speed of the system. Accordingly, the technology described herein provides a photogrammetry system for monitoring the position and/or orientation of targets with not only better accuracy, but also increased flexibility and versatility.

Furthermore, by determining 3D positions of the target(s) locally at each node and transferring the 3D positions (e.g. in the form of target data) to the hub controller 106 for further processing, the system is able to avoid data transfer bottlenecks that would otherwise occur if, for example, the image data itself is transferred from each node 101, 102, 103, 104, 105 to the hub controller 106 for central image processing. This may be advantageous in that it increases the processing efficiency of the system and therefore reduces the overall processing time, thereby allowing real-time position monitoring.

The invention claimed is:

1. A photogrammetry system for determining a position of a target, comprising:
 a network of two or more nodes arranged about a scene which includes the target; and
 a hub controller in communication with the network of two or more nodes;
 wherein each node comprises:
 at least two digital cameras configured to capture a set of stereoscopic images of the scene in synchronicity with the other node or nodes in the network; and
 a processor configured to process the set of stereoscopic images to determine a three-dimensional position of the target and to cause the node to transmit target data including the three-dimensional position of the target to the hub controller, if the target is visible in the set of stereoscopic images; and
 wherein the hub controller is configured to:
 receive the target data from the network of two or more nodes; and
 determine a global position of the target in a first co-ordinate space, based on the three-dimensional positions included in the target data received from the network of two or more nodes;
 wherein the target comprises:
 a platform;
 a moveable marker arranged at a first predefined position on the platform; and
 a plurality of markers arranged in a predefined pattern; and
 wherein the processor of each node is further configured to process the set of stereoscopic images to determine the position of the moveable marker on the platform and identify the target based on the determined position; and
 wherein each of the processors or the hub controller is configured to determine an orientation of the target based on the three-dimensional positions of the plurality of markers.

2. The photogrammetry system of claim 1, wherein the network includes at least four nodes.

3. The photogrammetry system of claim 1, wherein:
 the three-dimensional position included in the target data is a relative position of the target from the node; and
 the hub controller is configured to:
 convert the relative position of the target to an absolute position in the first co-ordinate space, by determining a positional relationship between the target and a reference point, wherein a position of the reference point within the first co-ordinate space is known to the hub controller.

4. The photogrammetry system of claim 3, wherein:
 a reference target is located at the reference point within the scene;
 the processor of each node is configured to process the respective set of stereoscopic images to determine a three-dimensional position of the reference target relative to the node and to cause the node to transmit target data including the three-dimensional position of the reference target to the hub controller; and
 the hub controller is configured to determine the positional relationship between the target and the reference point by comparing their relative positions from the node.

5. The photogrammetry system of claim 3, wherein the hub controller is configured to receive reference data indicating the position of the reference point within the first co-ordinate space.

6. The photogrammetry system of claim 1, wherein:
 each node is configured to process the set of stereoscopic images to identify the target, if visible, and generate metadata indicating the determined identity of the target; and the target data that is transmitted to the hub controller further comprises the metadata.

7. The photogrammetry system of claim 1, wherein the hub controller is configured to determine the global position of the target by:
 performing a best-fit operation on plural three-dimensional positions determined for the target.

8. The photogrammetry system of claim 1, wherein the target comprises a marker for attaching to an object within the scene, or attached to an object within the scene.

9. The photogrammatery system of claim 1, wherein
 the processor is further configured to generate metadata indicating the determined identity of the target; and
 the target data transmitted to the hub controller comprises the metadata.

10. The photogrammetery system of claim 9, wherein the metadata includes one or more unique target identifiers.

11. The photogrammetry system of claim 9, wherein:
the platform has a plurality of attachment points arranged in a predefined array of positions on the platform; and
the moveable marker is suitable for being removably attached to the platform at any one of the attachment points at a time.

12. A method of operating a photogrammetry system comprising a network of two or mode nodes arranged about a scene which includes a target, the method comprising:
each of the nodes:
capturing a set of stereoscopic images of the scene using at least two digital cameras in synchronicity with the other node or nodes in the network;
processing the set of stereoscopic images to determine a three-dimensional position of the target and transmitting target data including the three-dimensional position of the target to a hub controller, if the target is visible within the stereoscopic images;
processing the set of stereoscopic images to determine a position of a moveable marker arranged on a platform of the target and identify the target based on the determined position; and
the hub controller:
receiving the target data from the network of two or more nodes; and
determining a global position of the target in a first co-ordinate space based on the three-dimensional positions included in the target data received from the network of two or more nodes;
wherein each of the nodes or the hub controller determines an orientation of the target based on determining three-dimensional positions of a plurality of markers arranged in a predefined pattern on the platform of the target.

13. The method of claim 12, wherein determining the global position of the target comprises performing a best-fit operation on plural three-dimensional positions determined for the target, and wherein the best-fit operation is a weighted fit of the three-dimensional positions, wherein the weighting attributed to each three-dimensional position is based on the relative position of the target from the node to which the three-dimensional position corresponds.

14. The method of claim 12, wherein:
the three-dimensional position included in the target data is a relative position of the target from the node; and
the method further comprises the hub controller converting the relative position of the target to an absolute position in the first co-ordinate space, by determining a positional relationship between the target and a reference point, wherein a position of the reference point within the first co-ordinate space is known to the hub controller.

15. The method of claim 14, wherein:
a reference target is located at the reference point within the scene; and
the method further comprises:
processing the set of stereoscopic images to determine a three-dimensional position of the reference target relative to the node and causing the node to transmit target data including the three-dimensional position of the reference target to the hub controller; and
the hub controller determining the positional relationship between the target and the reference point by comparing their relative positions from the node.

16. The method of claim 14, further comprising receiving, at the hub controller, reference data indicating the position of the reference point within the first co-ordinate space.

17. A method of claim 12, further comprising each node processing the set of stereoscopic images to identify the target within the scene and generating metadata indicating the determined identity of the target, wherein the target data further comprises the metadata.

18. The method of claim 12, further comprising:
the hub controller issuing a trigger command to instruct the nodes in the network to perform synchronous image capture; and
each node, in response to receiving the trigger command from the hub controller, capturing the set of stereoscopic images in synchronicity with the other nodes.

19. The method of claim 12, further comprising the two or more nodes processing the sets of stereoscopic images in parallel.

20. A method of operating a photogrammetry system to determine a position of a target, the photogrammetry system comprising:
a network of two or more nodes arranged about a scene which includes the target; and
a hub controller in communication with the network of two or more nodes;
the method comprising:
each of the nodes:
capturing a set of stereoscopic images of the scene using at least two digital cameras in synchronicity with the other node or nodes in the network;
a processor processing the set of stereoscopic images to determine a three-dimensional position of the target and transmitting target data including the three-dimensional position of the target to the hub controller, if the target is visible within the stereoscopic images; and
the hub controller:
receiving the target data from the network of two or more nodes; and
determining a global position of the target in a first co-ordinate space based on the three-dimensional positions included in the target data received from the network of two or more nodes, wherein determining the global position of the target comprises performing a best-fit operation on plural three-dimensional positions determined for the target, and wherein the best-fit operation is a weighted fit of the three-dimensional positions, wherein the weighting attributed to each three-dimensional position is based on the relative position of the target from the node to which the three-dimensional position corresponds.

* * * * *